US009129318B2

(12) United States Patent
Ding et al.

(10) Patent No.: US 9,129,318 B2
(45) Date of Patent: Sep. 8, 2015

(54) SYSTEM AND METHOD FOR ALLOCATING SUPPLIERS USING GEOGRAPHICAL INFORMATION SYSTEM AND SUPPLIER CAPABILITY

(75) Inventors: Hong W. Ding, Beijing (CN); Jin Dong, Beijing (CN); Young M. Lee, Yorktown Heights, NY (US); Minmin Qiu, Beijing (CN); Changrui Ren, Beijing (CN); Wei CRL Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1236 days.

(21) Appl. No.: 12/509,158

(22) Filed: Jul. 24, 2009

(65) Prior Publication Data
US 2011/0022440 A1 Jan. 27, 2011

(51) Int. Cl.
G06Q 30/00 (2012.01)
G06Q 30/06 (2012.01)
G06Q 30/02 (2012.01)

(52) U.S. Cl.
CPC .......... G06Q 30/06 (2013.01); G06Q 30/0205 (2013.01)

(58) Field of Classification Search
None
See application file for complete search history.

(56) References Cited

U.S. PATENT DOCUMENTS

| 5,450,317 | A * | 9/1995 | Lu et al. .......... 705/7.24 |
|---|---|---|---|
| 5,890,140 | A * | 3/1999 | Clark et al. .......... 705/35 |
| 6,782,369 | B1 * | 8/2004 | Carrott .......... 705/7.34 |
| 6,850,235 | B2 * | 2/2005 | Levanon et al. .......... 345/423 |
| 7,146,331 | B1 * | 12/2006 | Young .......... 705/26.3 |
| 7,305,364 | B2 * | 12/2007 | Nabe et al. .......... 705/37 |
| 7,467,091 | B2 * | 12/2008 | Irwin .......... 705/330 |
| 7,546,254 | B2 * | 6/2009 | Bednarek .......... 705/26.1 |
| 7,778,882 | B2 * | 8/2010 | Chatter et al. .......... 705/26.3 |
| 7,881,978 | B2 * | 2/2011 | Baptiste .......... 705/26.4 |
| 7,953,548 | B2 * | 5/2011 | Vengroff et al. .......... 701/425 |
| 8,140,442 | B2 * | 3/2012 | Heyer .......... 705/313 |
| 8,239,229 | B1 * | 8/2012 | Paiz .......... 705/7.11 |
| 2002/0010651 | A1 * | 1/2002 | Cohn et al. .......... 705/26 |
| 2002/0055878 | A1 * | 5/2002 | Burton et al. .......... 705/26 |
| 2002/0107746 | A1 * | 8/2002 | Jacoby, Jr. .......... 705/26 |
| 2002/0145606 | A1 * | 10/2002 | Levanon et al. .......... 345/423 |
| 2003/0216971 | A1 * | 11/2003 | Sick et al. .......... 705/26 |
| 2005/0010484 | A1 * | 1/2005 | Bohannon et al. .......... 705/26 |

(Continued)

OTHER PUBLICATIONS

Choy, King Lun, W. B. Lee, and Victor Lo. "An intelligent supplier management tool for benchmarking suppliers in outsource manufacturing." Expert Systems with applications 22.3 (2002): 213-224.*

(Continued)

Primary Examiner — Gurkanwaljit Singh
(74) Attorney, Agent, or Firm — Scully, Scott, Murphy & Presser, P.C.; Daniel P. Morris, Esq.

(57) ABSTRACT

A system and method for allocating suppliers to customers locate a plurality of suppliers in a geographical information system. Relative capability associated with each of the plurality of suppliers is determined. For each supplier in the plurality of suppliers, the system and method generate lines by linking said each supplier to neighboring suppliers in the plurality of suppliers, establish relative capability points on the lines between said each supplier and the neighboring suppliers, and define boundaries of a coverage region associated with said each supplier based on the relative capability points. A customer located in the coverage region is allocated to the associated supplier of the coverage region.

21 Claims, 10 Drawing Sheets

(56) References Cited

U.S. PATENT DOCUMENTS

| | | |
|---|---|---|
| 2005/0144116 A1* | 6/2005 | Jacoby, Jr. ............... 705/37 |
| 2005/0251440 A1* | 11/2005 | Bednarek ............... 705/10 |
| 2006/0122917 A1* | 6/2006 | Lokuge et al. ............... 705/27 |
| 2006/0167784 A1* | 7/2006 | Hoffberg ............... 705/37 |
| 2006/0173754 A1* | 8/2006 | Burton et al. ............... 705/27 |
| 2006/0287810 A1* | 12/2006 | Sadri et al. ............... 701/200 |
| 2006/0293971 A1* | 12/2006 | Hunter et al. ............... 705/26 |
| 2007/0100802 A1* | 5/2007 | Celik ............... 707/3 |
| 2007/0239569 A1* | 10/2007 | Lucas et al. ............... 705/28 |
| 2007/0239589 A1* | 10/2007 | Wilson et al. ............... 705/37 |
| 2008/0222038 A1* | 9/2008 | Eden et al. ............... 705/44 |
| 2008/0270209 A1* | 10/2008 | Mauseth et al. ............... 705/7 |
| 2008/0270248 A1* | 10/2008 | Brill ............... 705/26 |
| 2009/0132270 A1* | 5/2009 | Baptiste ............... 705/1 |
| 2009/0327148 A1* | 12/2009 | Kamar et al. ............... 705/80 |
| 2010/0211431 A1* | 8/2010 | Lutnick et al. ............... 705/10 |
| 2010/0262505 A1* | 10/2010 | Fields ............... 705/26 |
| 2011/0047140 A1* | 2/2011 | Free ............... 707/706 |

OTHER PUBLICATIONS

Gardner, John T., and Martha C. Cooper. "Strategic Supply Chain Mapping Approaches."*

Coe, Neil M., and H. W. C. Yeung. "Geographical perspectives on mapping globalisation." Journal of Economic Geography 1.4 (2001): 367-456.*

Junglas, Iris A., and Richard T. Watson. "Location-based services."Communications of the ACM 51.3 (2008): 65-69.*

Ghodsypour et al., The total cost of logistics in supplier selection, under conditions of multiple sourcing, multiple criteria and capacity constraint, International Journal of Production Economics, 2001.

Weber et al, Vendor selection criteria and methods, European Journal of Operational Research, 1991.

* cited by examiner

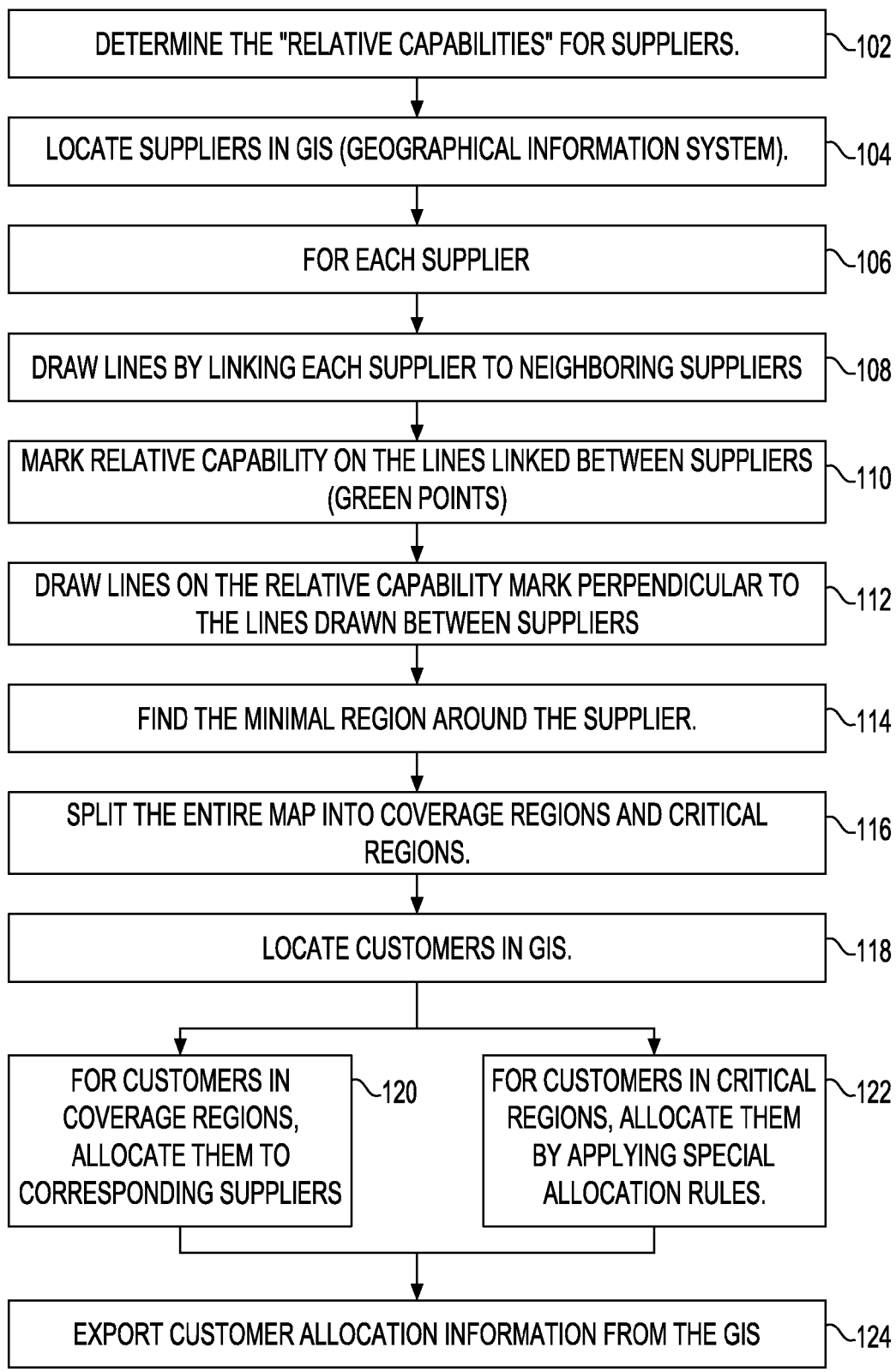

LOCATE SUPPLIERS IN GEOGRAPHICAL INFORMATION SYSTEM

DRAW (DASHED) LINES BY LINKING EACH SUPPLIER TO ALL NEIGHBORING SUPPLIERS

MARK RELATIVE
CAPABILITY ON
THE LINES LINKED
BETWEEN
SUPPLIERS

DRAW (SOLID)
LINES ON THE
RELATIVE
CAPABILITY MARK
PERPENDICULAR
TO THE LINES
DRAWN BETWEEN
SUPPLIERS

ASSOCIATE
INTERSECTIONS TO
EACH SUPPLIER
WITH (DASHED)
LINES.

- ASSOCIATION
WHEN (DASHED)
LINES DON'T CROSS
(SOLID) LINES
- DISASSOCIATION
WHEN (DASHED)
LINES CROSS THE
(SOLID) LINES

FIND THE
INNERMOST
POLYGON
AROUND THE
SUPPLIER.

- CONNECT ALL
ASSOCIATED
INTERSECTIONS.

SPLIT THE ENTIRE MAP INTO COVERAGE REGIONS AND CRITICAL REGIONS

LOCATE CUSTOMERS IN GIS

FOR CUSTOMERS IN COVERAGE REGIONS, ALLOCATE THEM TO CORRESPONDING SUPPLIERS.

FOR CUSTOMERS IN CRITICAL REGIONS, ALLOCATE THEM BY APPLYING SPECIAL ALLOCATION RULES

EXPORT CUSTOMER ALLOCATION INFORMATION FROM THE GIS
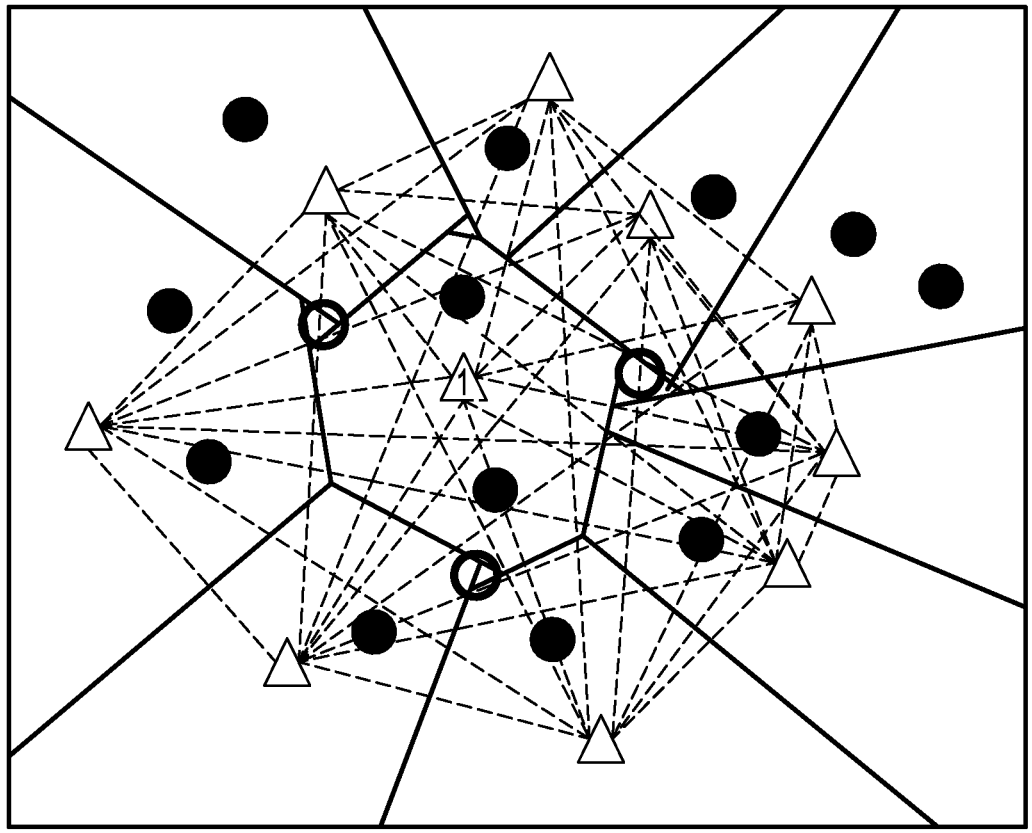
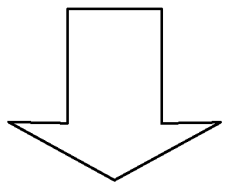
| CUSTOMERS | SUPPLIERS |
|---|---|
| CUSTOMER1 | SUPPLIER1 |
| CUSTOMER2 | SUPPLIER1 |
| CUSTOMER3 | SUPPLIER2 |
| CUSTOMER4 | SUPPLIER3 |
| CUSTOMER5 | SUPPLIER9 |
| CUSTOMER6 | SUPPLIER4 |
| CUSTOMER7 | SUPPLIER6 |
| ... | ... |
FIG. 2K

SYSTEM AND METHOD FOR ALLOCATING SUPPLIERS USING GEOGRAPHICAL INFORMATION SYSTEM AND SUPPLIER CAPABILITY

BACKGROUND

The present disclosure relates generally to supply chain systems, and more particularly to allocating suppliers using geographical information system and supplier capability.

A supply chain (e.g., retail chains) could include hundreds of customers and suppliers, and it is not trivial to allocate suppliers to customers. Effective allocation of suppliers is helpful in sizing the suppliers, and lead to better customer services and reduced costs (e.g., inventory), better utilization of resources such as warehousing space, transportation fleet. While the traditional methods for supplier selection are based on price, current inventory, historical records, business relationship and distance between the supplier and customer, they may not always provide an effective solution.

BRIEF SUMMARY

A method and system for allocating suppliers to customers are provided. The method, in one aspect, may include locating a plurality of suppliers in a geographical information system and determining relative capability associated with each of the plurality of suppliers. The method may also include for each supplier in the plurality of suppliers, generating lines by connecting said each supplier to neighboring suppliers in the plurality of suppliers; establishing relative capability points on the lines between said each supplier and the neighboring suppliers; defining boundaries of a coverage region associated with said each supplier based on the relative capability points; and allocating a customer located in the coverage region to the associated supplier of the coverage region.

A system for allocating suppliers to customers, in one aspect, may include a locator module operable to locate a plurality of suppliers in a geographical information system. A processing module may be operable to determine relative capability associated with each of the plurality of suppliers. For each supplier in the plurality of suppliers, the processing module may be further operable to generate lines by linking said each supplier to neighboring suppliers in the plurality of suppliers, establish relative capability points on the lines between said each supplier and the neighboring suppliers, and define boundaries of a coverage region associated with said each supplier based on the relative capability points. The processing module may be further operable to allocate a customer located in the coverage region to the associated supplier of the coverage region. The system may also include a user interface module operable to present allocation of customers to suppliers.

A program storage device readable by a machine, tangibly embodying a program of instructions executable by the machine to perform one or more methods described herein may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a flow diagram illustrating the method in one embodiment of allocating suppliers.

FIG. 2K illustrates an example of exported customer allocation data.

DETAILED DESCRIPTION

System and method are presented that automatically allocate suppliers to customers using geographical information system (GIS). GIS generally may be an information system that provides geographical information, for example, including mapping software or the like. It stores, displays, edits, and analyzes data that is linked to location, and it may allow users to create queries, edit existing data, add new data, and present results through its Application Programming Interfaces (API) or the like. The system and method in one aspect utilize GIS and relative supplier capability to automatically allocate suppliers to customers by selecting suppliers by splitting the geographical space into polygons with consideration of relative capabilities of suppliers and overlaying customer locations onto it. For example, a given geographical area may be divided into multiple areas of polygon shape or having polygonal boundaries.

FIG. 1 is a flow diagram illustrating the method in one embodiment of allocating suppliers. At 102, relative capabilities for suppliers are determined. Relative capabilities for suppliers refer to an overall capability of a supplier, and may be represented as a number. Other representations are possible. Examples may include but are not limited to the storage space of warehouse, number of transportation medium such as vehicles like trucks or others or the like, average inventory on-hand, and average operation cost. The relative capability can also be a combination of several parameters or performance indicators. For example, $$C = w_1 C_1 + w_2 C_2 + w_3 C_3 + w_4 C_4$$

where
C is overall capacity of a supplier, $C_1$ is storage space, $C_2$ is number of trucks or other transportation medium, $C_3$ is average inventory and $C_4$ is average operating cost, and $w_1$ is relative weight factor for storage space, $w_2$ is relative weight factor for number of trucks, $w_3$ is relative weight factor for average inventory and $w_4$ is relative weight factor for average operating cost. Relative weight factors may be established, determined or computed based on one or more objectives of an enterprise, organization or entity, and may represent the importance given to each parameter or performance indicators.

Table 1 shows example relative capability computed based on a parameter, average on-hand inventory level. This example uses average on-hand inventory level as measures of the relative capabilities for ten suppliers.

TABLE 1

| | Supplier | | | | | | | | | |
|---|---|---|---|---|---|---|---|---|---|---|
| | 1 | 2 | 3 | 4 | 5 | 6 | 7 | 8 | 9 | 10 |
| Average inventory level | 30000 | 32000 | 30000 | 30000 | 35000 | 27000 | 32000 | 28000 | 26000 | 31000 |
| Relative capability | 30 | 32 | 30 | 30 | 35 | 27 | 32 | 28 | 26 | 31 |

Figure 2A:
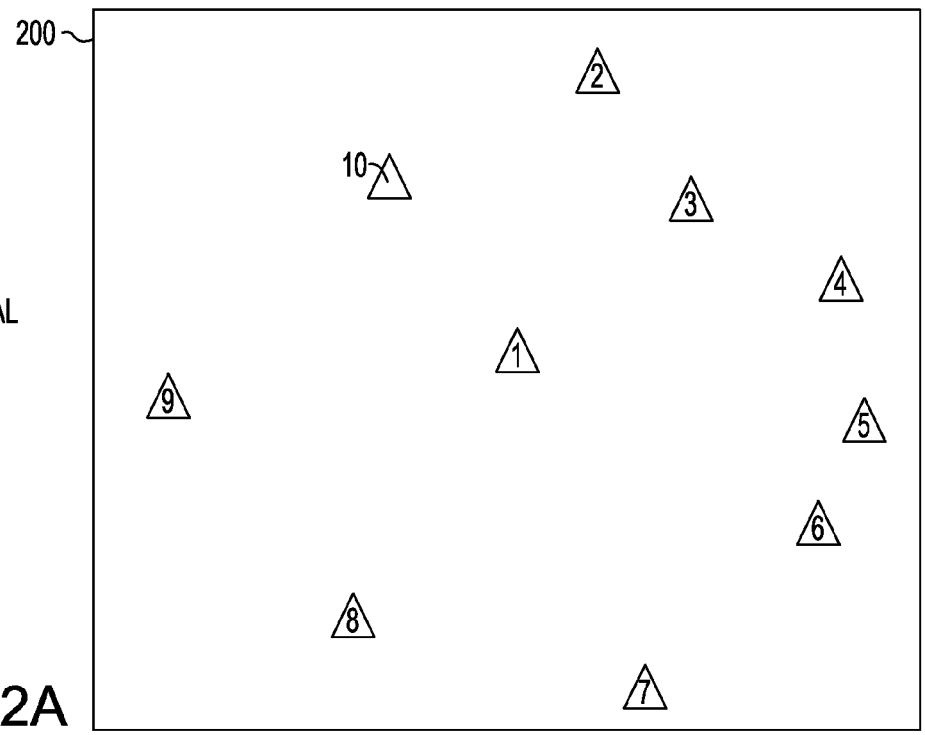
FIG. 2A shows an example of a geographical map shown using GIS and a plurality of suppliers (1-10) located through the areas of the map.

At 104, GIS is searched to locate the suppliers. FIG. 2A shows an example of a geographical map 200 shown using GIS and a plurality of suppliers (1-10) located through the areas of the map 200. Each supplier has an address (or geocode: longitude and latitude) or the like, and GIS may be used with such supplier location data to locate the supplier on a geographical map.

Figure 2B:
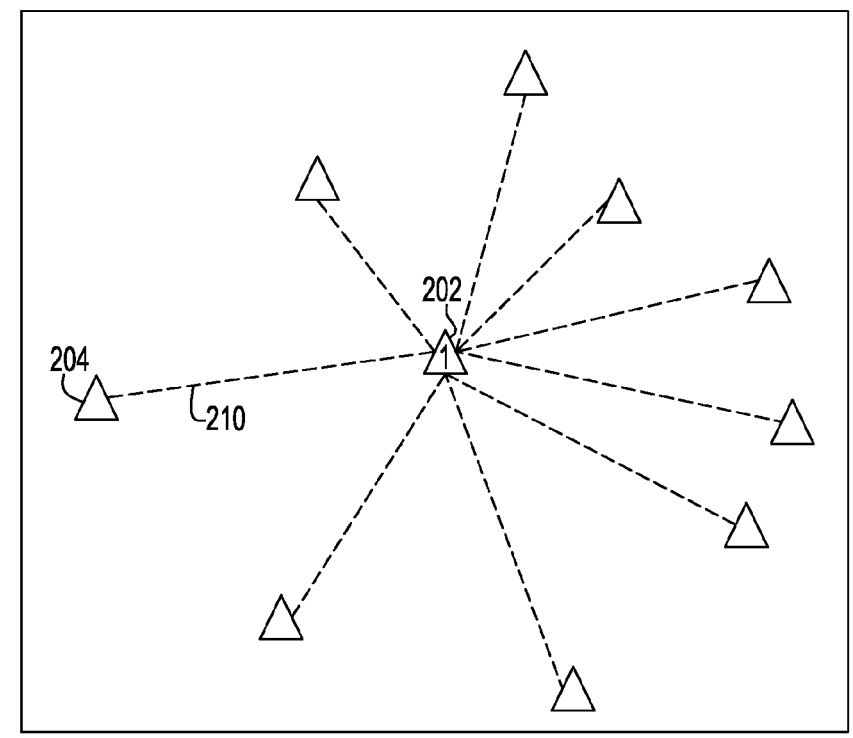
FIG. 2B shows examples of links with respect to a supplier.

Referring to FIG. 1, at 106, for each supplier, steps 108, 110, 112 and 114 are performed. At 108, lines are generated to link each supplier to neighboring suppliers, i.e., connections are made between a supplier and its neighboring suppliers. Generating the lines may include deriving a linear equation connecting the points (e.g., representing the supplier locations). A user interface may display the lines by drawing the connections. FIG. 2B shows an example of such links or connections or the like (e.g., 210) with respect to supplier 1 (202). Each of the suppliers, e.g., 210 shown in FIG. 2A may be mapped similarly. An instruction may be given inside of GIS system to draw a line between two nodes (e.g., between two suppliers) iteratively.

Figure 2C:
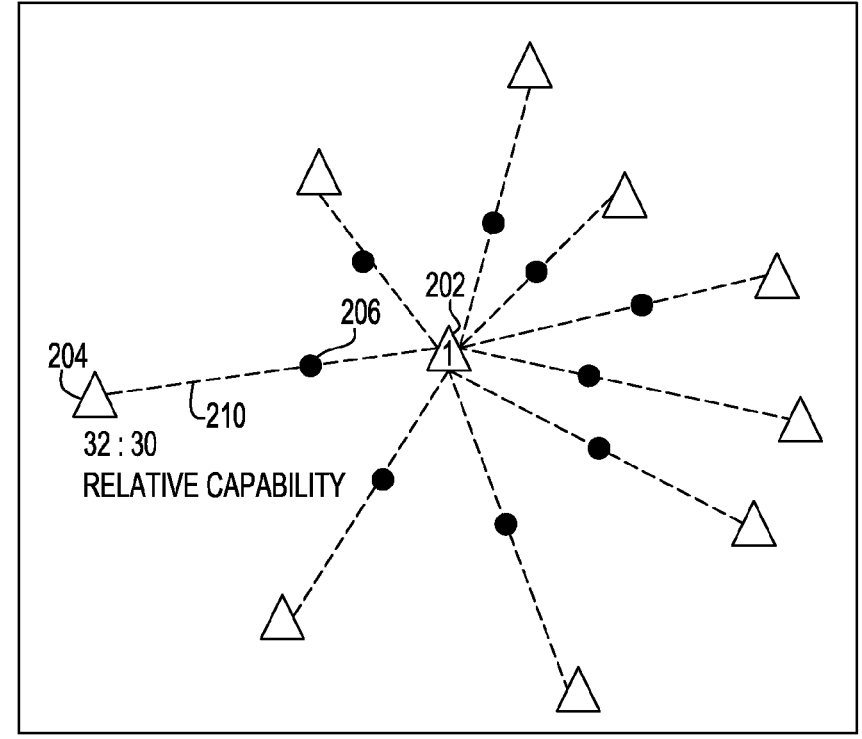
FIG. 2C illustrates and example of relative capability marks placed on a line connecting supplier 1 and its neighboring supplier.

Referring again to FIG. 1, at 110, relative capability is marked as a point on a line linking the suppliers. The position of the mark on the line is determined based on the relative capability of the supplier 1 (202) relative to the capability of the supplier (204) that the supplier 1 (202) is linked to. For example, based on the data in Table 1, the relative capability between the supplier 1 and supplier 2 is 30:32 or 15:16. If the distance between the supplier 1 and 2 are 100 miles, then the relative capability mark is positioned 48.3 8 miles, i.e., 100*15/(15+16), away from the supplier 1 and 51.62 miles away from the supplier 2. FIG. 2C illustrates an example of relative capability mark (206) placed on a line connecting supplier 1 (202) and its neighboring supplier (204). At least one relative capability point is placed between two suppliers.

Figure 2D:
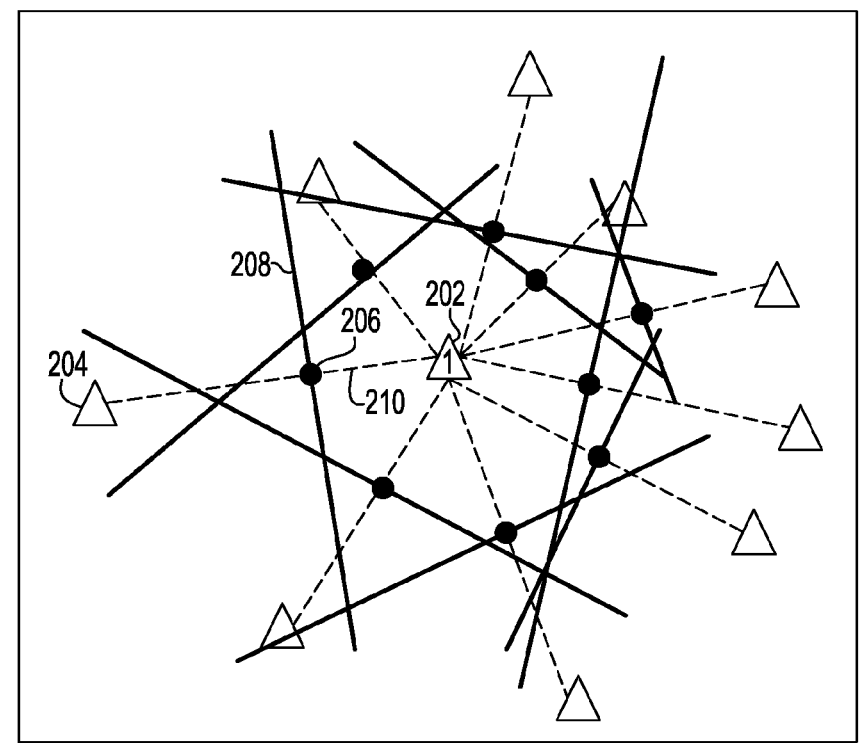
FIG. 2D shows examples of the perpendicular lines.

At 112, lines or connections or the like are drawn on the relative capability marks or points or the like, and perpendicular to the lines drawn between suppliers. For instance, a line that passes through the relative capability mark and that is perpendicular or orthogonal to the line connecting a supplier to its neighboring supplier is drawn. Such perpendicular line may be drawn for each of the relative capability mark. FIG. 2D shows examples of the perpendicular lines. Take for example supplier 1 (202) and its neighboring supplier (204). A perpendicular line (208) to the line (210) connecting the two suppliers is drawn or placed through the relative capability point (206).

Figure 2E:
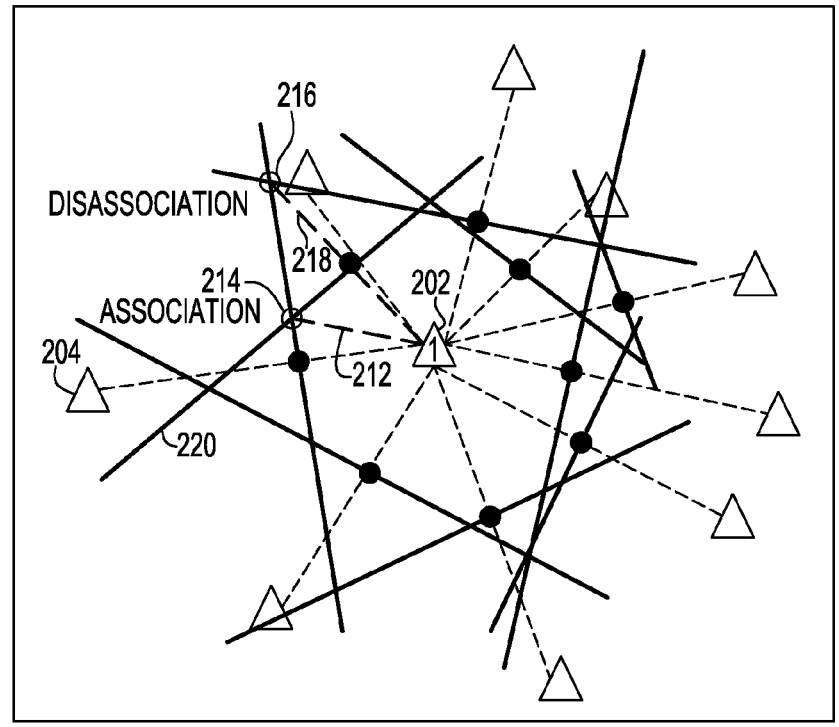
FIG. 2E shows examples of association lines used in forming a minimal region.
Figure 2F:
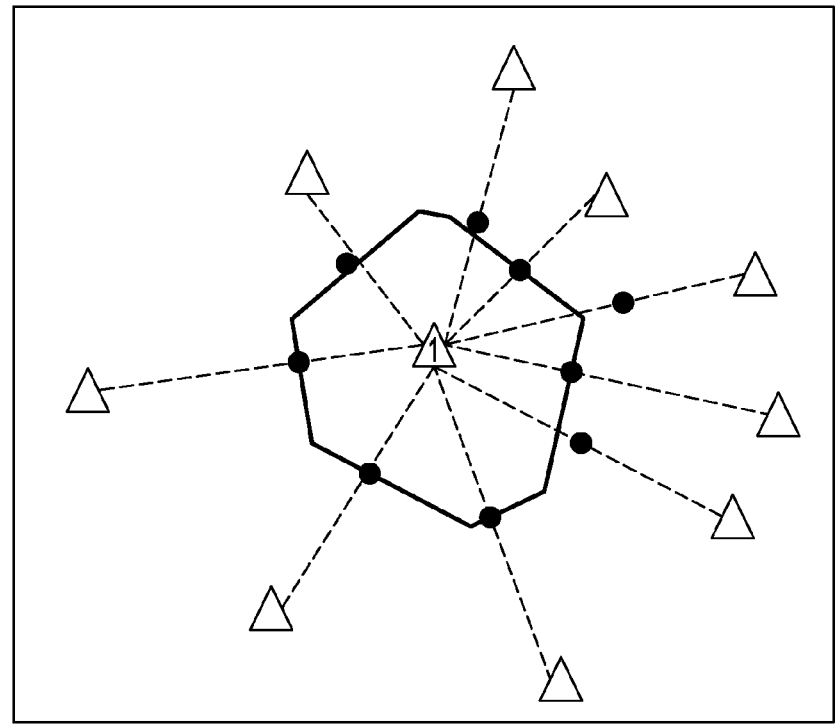
FIG. 2F shows an example of minimal regions.

At 114, Minimal region around the supplier is determined. For example, to find the minimal region around the supplier, intersections between the perpendicular lines are determined. Intersections are then associated, for example, via a line from supplier 1 to the intersections. If the associated lines do not cross another perpendicular line, the intersection point forms a boundary point for the minimal region. An example is shown in FIG. 2E. For each intersection (e.g., 214, 216), association lines (e.g., 212, 218) are formed or drawn between the supplier (204) and the intersections. The association line (212) does not cross any perpendicular lines, therefore, the intersection point (214) forms a boundary point. On the other hand, the association line (218) crosses a perpendicular line (220) to get to the intersection (216). Thus, this intersection point (216) is not used in determining the minimal region. In the similar manner, all intersection points around the supplier (202) are established. The perpendicular lines connecting those intersection points form the minimal region. The minimal region formed accordingly is shown in FIG. 2F. A minimal region for another supplier (e.g., suppliers 2-10) may be formed similarly.

Figure 2G:
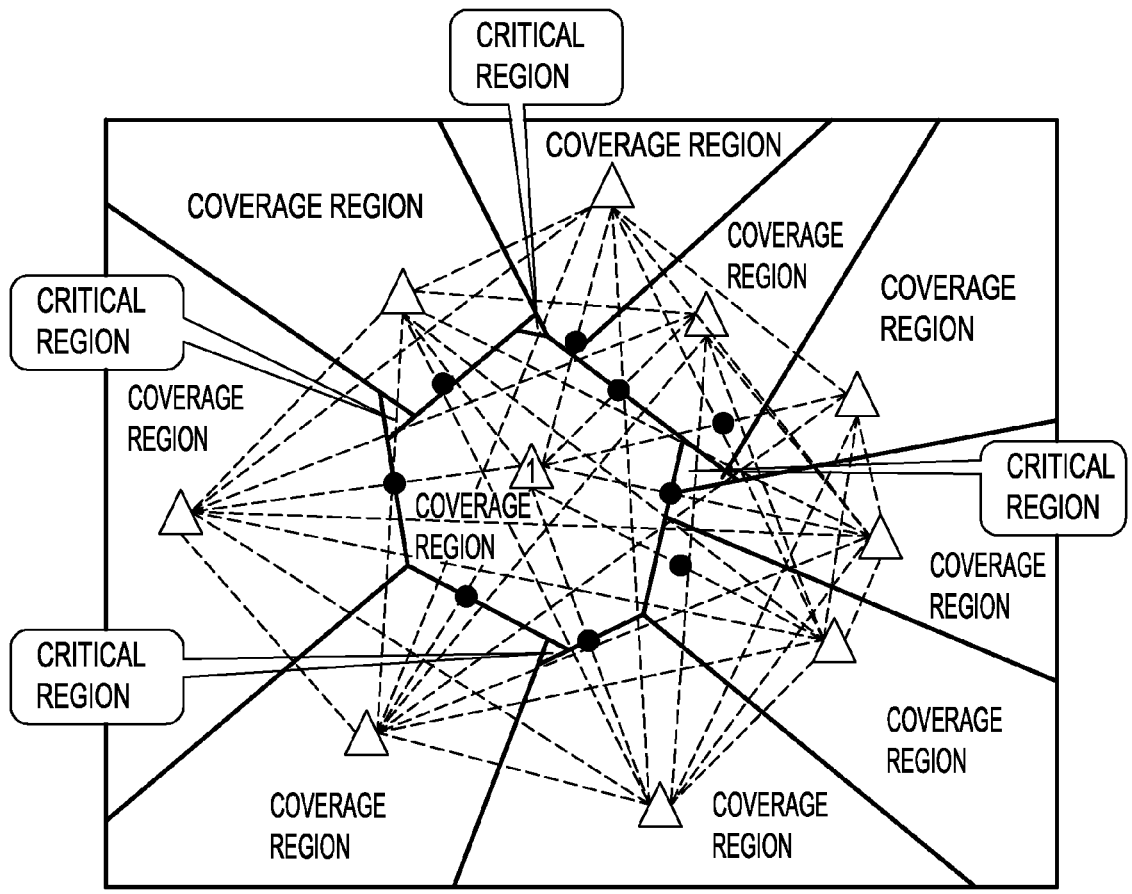
FIG. 2G shows an example of coverage and critical regions.

At 116, the entire map is split or divided into coverage regions and critical regions. Coverage regions refer to the minimal regions determined for each of the suppliers in the region being considered. Critical regions refer to those areas in the region being considered that are not covered by any of the minimal regions for the suppliers. That is, no suppliers are located within the boundaries that form the critical regions. Critical regions result from the above-described intersection connecting method when determining the minimal regions. FIG. 2G shows an example of covered and critical regions.

Figure 2H:
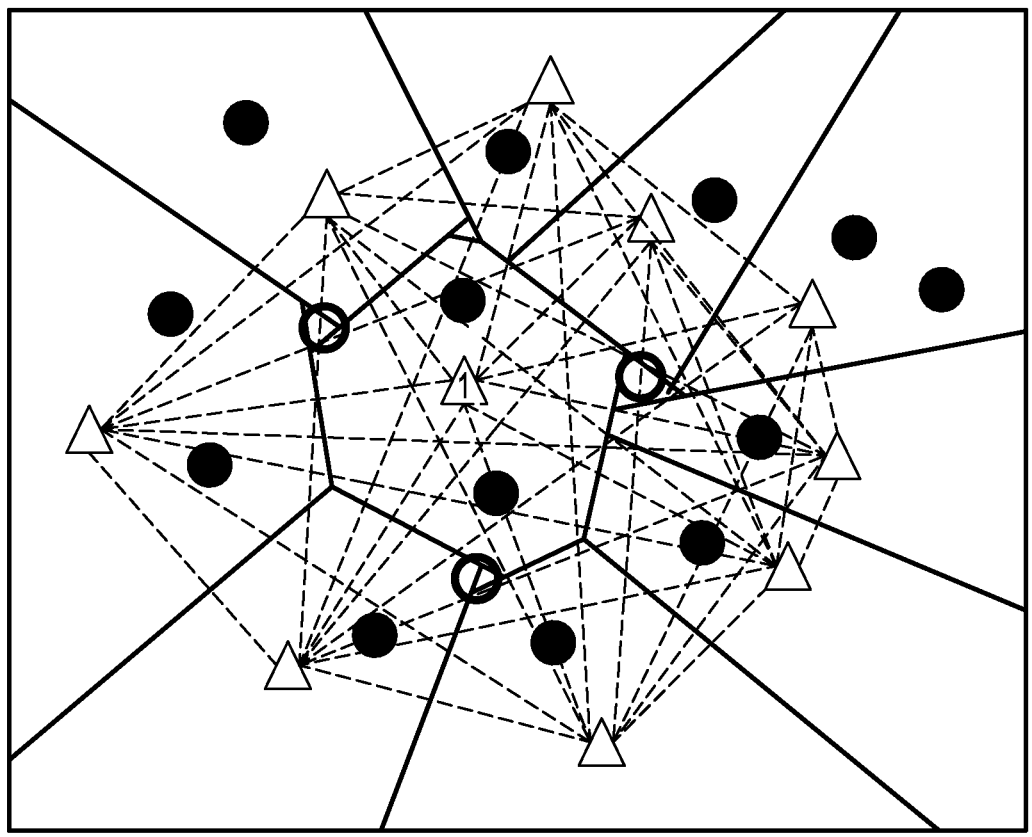
FIG. 2H shows examples of customer locations overlaid on top of the map having coverage and critical regions.
Figure 2I:
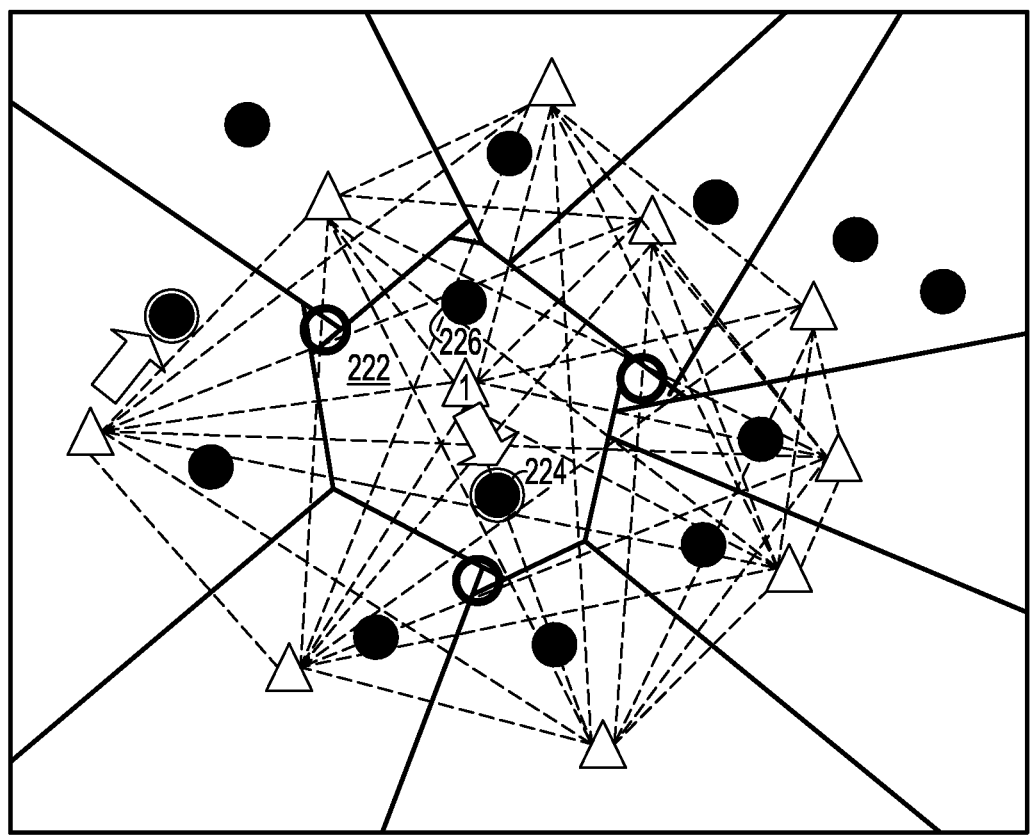
FIG. 2I shows an example of the customer locations mapped to the coverage and critical regions.

At 118, customers are located in GIS. Each customer has an address or geocode that specifies the longitude and latitude, or the like, and GIS may be used with the customer location data to locate the customer on the map. FIG. 2H shows examples of customer locations overlaid on top of the map having covered and critical regions, where the circles represent the location of the customers. At 120, the customers located in coverage regions are allocated to corresponding suppliers. FIG. 2I shows an example of the customer locations mapped to the covered and critical regions. For example, customers (224, 226) located within the minimal region (222) for supplier 1 (202) are allocated to supplier 1. Other customers are similarly allocated to other suppliers based on their GIS locations and defined minimal regions associated with the other suppliers.

Figure 2J:
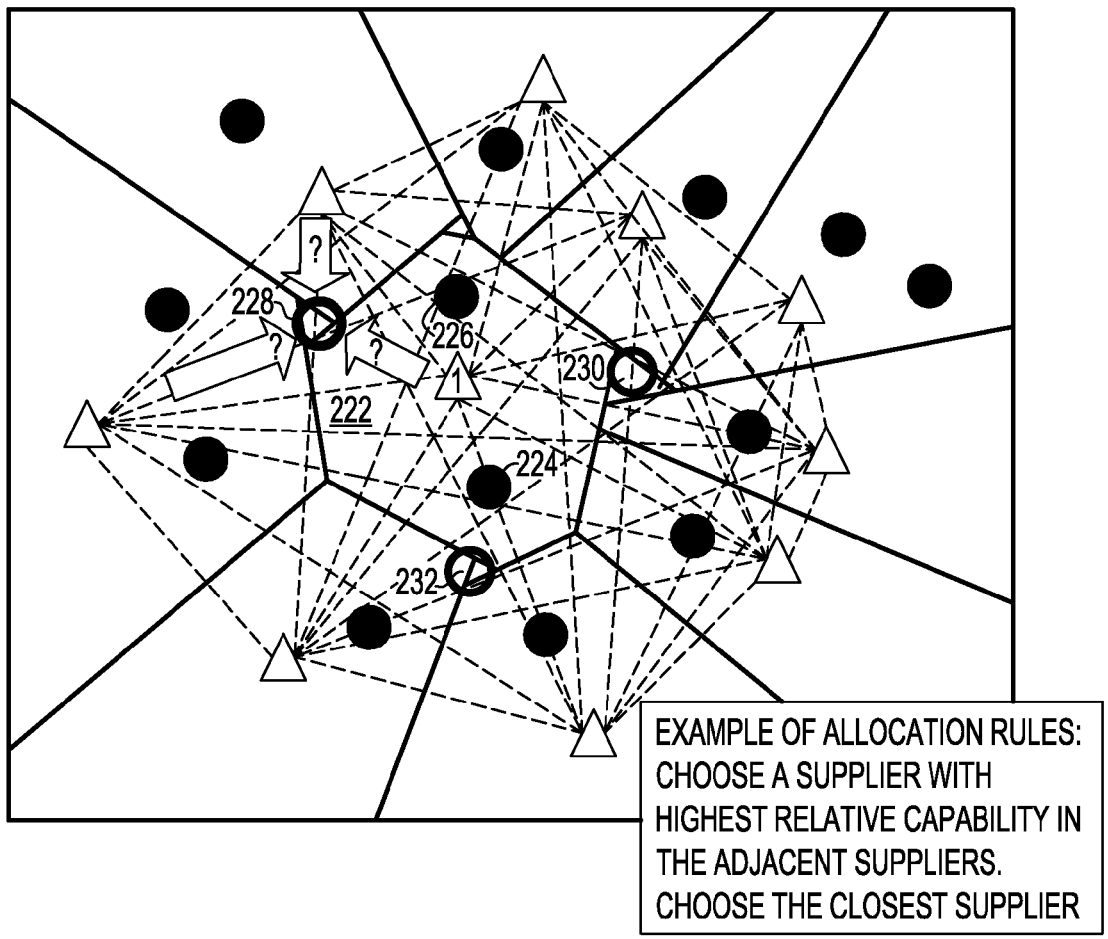
FIG. 2J illustrates an example of customers in located in critical regions.

At 122, the customers in critical regions are allocated by applying an allocation rule. FIG. 2J illustrates an example of customers in located in critical regions. For instance, customers (228, 230, 232) are allocated to suppliers based on one or more allocation rules. An example of an allocation rule may include but is not limited to choosing a supplier with highest relative capability in the adjacent suppliers. For example, the customer 228 is located in a critical region and has three neighboring suppliers (1, 2 and 3). Using the relative capability as allocation rule, the supplier 2 is chosen as the supplier for the customer 228 because the relative capability of supplier 2 is 32 while that of supplier 1 and 3 is only 30. Another example of an allocation rule may be choosing the closest supplier.

At 124, customer allocation information is exported from the GIS. A computer code or instruction or the like inside GIS can generate a table which shows which supplier each customer is allocated to, and the table information can be further exported into a text table file or a spreadsheet table outside of GIS system. For example, a table of customer and supplier list may be provided as shown in FIG. 2K.

As described above, the system and method of the present disclosure may be implemented using GIS and its functionalities. In one embodiment, some or all of the functionalities of a GIS may be incorporated with a plug-in module or the like into the system and method of the present disclosure. In another embodiment, similar functionalities of a GIS may be independently implemented and used in the system and method of the present disclosure. Other implementations that allow the system and method of the present disclosure to utilize GIS functionalities may be also contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be preformed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
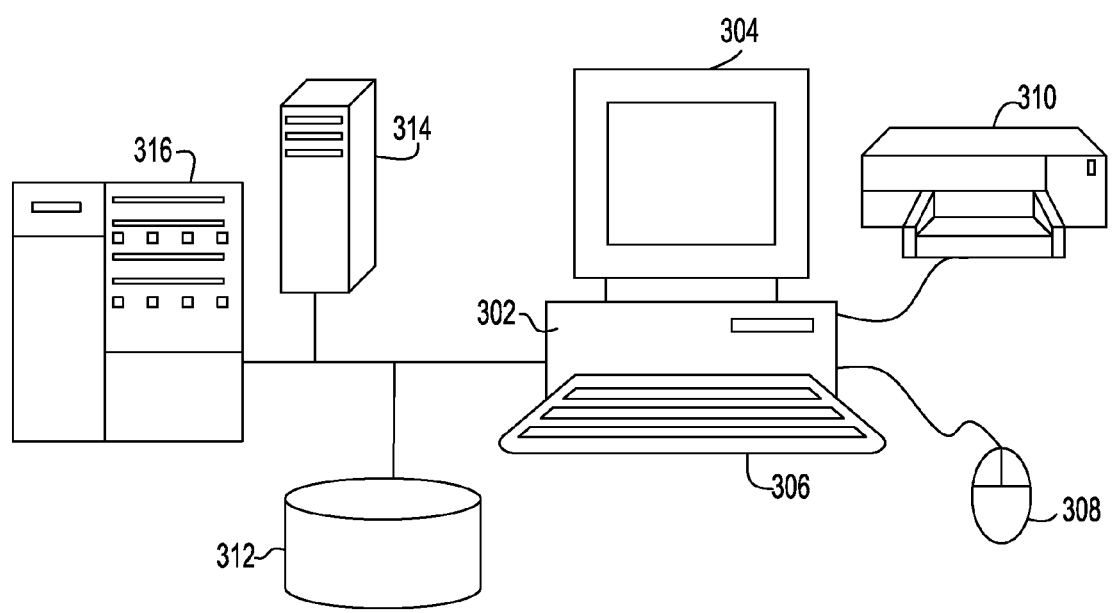
FIG. 3 illustrates an example a computer system which may carry out or execute the systems and methodologies of the present disclosure in one embodiment.

Referring now to FIG. 3, the systems and methodologies of the present disclosure may be carried out or executed in a computer system that includes a processing unit 302, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 302 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 316), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for allocating suppliers to customers, comprising:

locating a plurality of suppliers in a geographical information system, the geographical information system comprising at least location information that represent a physical geographical map;

determining relative capability associated with each of the plurality of suppliers;

for each supplier in the plurality of suppliers,
generating by one or more processors, lines connecting said supplier to neighboring suppliers in the plurality of suppliers, the lines being geometric lines between said each supplier and each of the neighboring suppliers, the lines generated in the geographical information system via an application programming interface to the geographical information system;
establishing by the one or more processors, relative capability points on the lines between said supplier and the neighboring suppliers;

for each of said lines having an associated relative capability point on said line, generating a perpendicular line that passes through the associated relative capability point and perpendicular to said line, wherein a plurality of perpendicular lines are formed respectively associated with the lines;

selecting intersection points of said perpendicular lines that if a secondary line is drawn between the supplier and a respective intersection point, the secondary line does not cross the plurality of perpendicular lines, wherein the selected intersection points represent boundary points;

forming a coverage region that is defined by the perpendicular lines intersecting at the boundary points;

allocating by one or more processors, a customer located in the coverage region to the associated supplier of the coverage region; and presenting on a display device at least a portion of the physical geographical map represented in the geographical information system, said portion of the physical geographical map at least showing the coverage region, a representation of the customer located in the coverage region and a representation of the asociated supplier of the coverage region via the application programming interface.

2. The method of claim 1, wherein the relative capability of suppliers is determined by factors comprising one or more of storage space of warehouse, number of transportation trucks, or average inventory on-hand or average operation cost or combinations thereof.

3. The method of claim 1, further including:
establishing by the one or more processors, one or more critical regions that are outside the boundaries of coverage regions for all suppliers.

4. The method of claim 3, wherein the one or more critical regions are defined by lines established on the relative capability points perpendicular to the lines generated between suppliers, the established lines forming one or more polygons without a supplier in the one or more polygons.

5. The method of claim 3, further including:
allocating by the one or more processors, a customer located in the critical region to a selected supplier using one or more rules.

6. The method of claim 5, wherein the one or more rules include:
considering relative capability in the adjacent suppliers.

7. The method of claim 5, wherein the one or more rules include:
considering distance to the adjacent suppliers.

8. The method of claim 1, further including exporting supplier allocation information from the graphical information system into an electronic document.

9. The method of claim 1, further including presenting supplier allocation information on a graphical user interface.

10. A non-transitory program storage device readable by a machine, tangibly embodying a program of instructions executable by the machine to perform a method for allocating suppliers to customers, comprising:

locating a plurality of suppliers in a geographical information system, the geographical information system comprising at least location information that represent a physical geographical map;

determining relative capability associated with each of the plurality of suppliers;

for each supplier in the plurality of suppliers,
generating by a processor lines by linking said each supplier to neighboring suppliers in the plurality of suppliers, the lines being geometric lines between said supplier and each of the neighboring suppliers, the lines generated in the geographical information system via an application programming interface to the geographical information system;

establishing by a processor relative capability points on the lines between said supplier and the neighboring suppliers;

for each of said lines having an associated relative capability point on said line, generating a perpendicular line that passes through the associated relative capability point and perpendicular to said line, wherein a plurality of perpendicular lines are formed respectively associated with the lines;

selecting intersection points of said perpendicular lines that if a secondary line is drawn between the supplier and a respective intersection point, the secondary line does not cross the plurality of perpendicular lines, wherein the selected intersection points represent boundary points;

forming a coverage region that is defined by the perpendicular lines intersecting at the boundary points;

allocating by a processor a customer located in the coverage region to the associated supplier of the coverage region; and presenting on a display device at least a portion of the physical geographical map represented in the geographical information system, said portion of the physical geographical map at least showing the coverage region, a representation of the customer located in the coverage region and a representation of the associated supplier of the coverage region via the application programming interface.

11. The non-transitory program storage device of claim 10, wherein the relative capability of suppliers is determined by factors comprising one or more of storage space of warehouse, number of transportation trucks, or average inventory on-hand or average operation cost or combinations thereof.

12. The non-transitory program storage device of claim 10, further including:
establishing by a processor one or more critical regions that are outside the boundaries of coverage regions for all suppliers.

13. The non-transitory program storage device of claim 12, wherein the one or more critical regions are defined by lines established on the relative capability points perpendicular to the lines generated between suppliers, the established lines forming one or more polygons without a supplier in the one or more polygons.

14. The non-transitory program storage device of claim 12, further including:
allocating by a processor a customer located in the critical region to a selected supplier using one or more rules.

15. The non-transitory program storage device of claim 14, wherein the one or more rules include:
considering relative capability in the adjacent suppliers and distance to the adjacent suppliers.

16. A system for allocating suppliers to customers, comprising:
a hardware processor;
a locator module operable to locate a plurality of suppliers in a geographical information system, the geographical information system comprising at least location information that represent a physical geographical map;
a processing module executing on the hardware processor and to determine relative capability associated with each of the plurality of suppliers, for each supplier in the plurality of suppliers, the processing module further operable to generate lines by linking said each supplier to neighboring suppliers in the plurality of suppliers, the lines being geometric lines between said supplier and each of the neighboring suppliers, the lines generated in the geographical information system via an application programming interface to the geographical information system, the processing module further operable to establish relative capability points on the lines between said supplier and the neighboring suppliers, for each of said lines having an associated relative capability point on said line, the processing module further operable to generate a perpendicular line that passes through the associated relative capability point and perpendicular to said line, wherein a plurality of perpendicular lines are formed respectively associated with the lines, select intersection points of said perpendicular lines that if a secondary line is drawn between the supplier and a respective intersection point, the secondary line does not cross the plurality of perpendicular lines, wherein the selected intersection points represent boundary points, and form a coverage region that is defined by the perpendicular lines intersecting at the boundary points; and a user interface module operable to present on a display device at least a portion of the physical geographical map represented in the geographical information system, said portion of the physical geographical map at least showing the coverage region, a representation of a customer located in the coverage region and a representation of associated supplier of the coverage region via the application programming interface.

17. The system of claim 16, wherein the processing module is operable to establish one or more critical regions that are outside the boundaries of coverage regions for all suppliers.

18. The system of claim 17, wherein the coverage regions are defined by lines established on the relative capability points perpendicular to the lines generated between suppliers, the established lines forming one or more polygons with a supplier in the one or more polygons, and wherein the one or more critical regions are defined by lines established on the relative capability points perpendicular to the lines generated between suppliers, the established lines forming one or more polygons without a supplier in the one or more polygons.

19. The system of claim 17, wherein the processing module generates the lines linking said each supplier to neighboring suppliers by deriving a linear equation connecting a point representing a location of a supplier to another.

20. The method of claim 1, wherein the generating lines connecting said each supplier to neighboring suppliers includes deriving linear equations connecting a point representing a location of said each supplier with one or more points representing locations of the neighboring suppliers.

21. The non-transitory program storage device of claim 10, wherein the generating lines by linking said each supplier to neighboring suppliers in the plurality of suppliers includes deriving linear equations connecting a point representing a location of said each supplier with one or more points representing locations of the neighboring suppliers.

* * * * *